United States Patent
Hussy

(10) Patent No.: US 6,748,822 B2
(45) Date of Patent: Jun. 15, 2004

(54) STEERING-WHEEL COVER

(75) Inventor: Karl Hussy, Waldaschaff (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 10/301,640

(22) Filed: Nov. 22, 2002

(65) Prior Publication Data

US 2003/0121360 A1 Jul. 3, 2003

Related U.S. Application Data

(63) Continuation of application No. PCT/DE01/02080, filed on May 23, 2001.

(30) Foreign Application Priority Data

May 24, 2000 (DE) ........................... 200 09 877 U

(51) Int. Cl.$^7$ ................................ B62D 1/06
(52) U.S. Cl. ........................... 74/558; 74/552
(58) Field of Search ........................ 74/558, 552

(56) References Cited

U.S. PATENT DOCUMENTS

RE24,613 E * 3/1959 Hageltorn ............... 428/121
3,476,897 A * 11/1969 Vincent ................... 200/61.57
4,581,954 A * 4/1986 Uchida .................... 74/552
6,112,619 A * 9/2000 Campbell ................. 74/553
6,250,666 B1 * 6/2001 Ross ....................... 280/728.2
6,401,567 B1 * 6/2002 Sugiyama et al. ........ 74/558
6,418,814 B1 * 7/2002 Emeneth et al. .......... 74/552

FOREIGN PATENT DOCUMENTS

| DE | 30 35 074 A1 | 4/1981 | |
| DE | 29803133 U1 * | 4/1998 | ............ B62D/1/06 |
| DE | 299 10 997 U1 | 12/1999 | |
| EP | 0 820 914 A2 | 7/1997 | |
| EP | 0 849 127 A2 | 6/1998 | |
| WO | WO 98/33693 A1 | 8/1998 | |

* cited by examiner

Primary Examiner—David Fenstermacher
(74) Attorney, Agent, or Firm—Foley & Lardner LLP

(57) ABSTRACT

A steering wheel cover for covering a section of a steering wheel with at least one covering piece which surround the steering wheel body along the section of the steering wheel to be covered and which may be fixed relative to the steering wheel body by means of a catch connection. The catch connection is produced by the engagement of a catch element with a corresponding catch segment. An additional catch lock with a stop-face may be provided, on which the catch element may rest and which hinders a release of the catch connection.

26 Claims, 2 Drawing Sheets

STEERING-WHEEL COVER

CROSS-REFERENCE TO RELATED APPLICATIONS

This is a continuation of International Application PCT/DE01/02080, which has an international filing date of May 23, 2001; this International Application was not published in English, but was published in German as WO 01/89908.

BACKGROUND

The invention relates to a steering-wheel cover for covering a section of a steering wheel.

In the prior art, the use of two covering pieces to cover sections of a steering wheel with a steering-wheel cover is known, the two covering pieces completely or partially surrounding the steering wheel body along the section of steering wheel to be covered and being connected to one another by means of a catch connection. In this arrangement, a catch hook on one covering piece engages behind a catch section on the other. To secure this catch connection reliably against release, the two covering pieces are additionally bonded, screwed or riveted to one another or are additionally connected in this way to the steering wheel body. In addition to the actual catch elements, there are thus further connecting means, which are intended to ensure a reliable permanent connection of the covering pieces.

SUMMARY OF THE INVENTION

An object underlying the invention is to provide a steering-wheel cover that is distinguished by simplicity of construction.

According to an embodiment of the invention, a steering-wheel is provided including a covering piece surrounding the section of the steering wheel body to be covered, the covering piece being fixed relative to the steering wheel body by a catch connection. The connection includes a catch element engaging behind an associated catch segment and a catch lock with a stop face positioned to engage the catch element and counteract the release of the catch connection.

The solution according to the invention has the advantage that no additional fastening means, e.g. a screw, a rivet or an adhesive, is required to secure the catch connection that fixes the at least one covering piece relative to the steering wheel. The function of securing the catch connection is assumed by a stop face, on which the catch element is supported in such a way that it cannot disengage from the associated catch section.

The covering piece is preferably capable of being pushed onto the steering wheel body in a first direction, the catch element snapping behind the catch section (e.g. by means of a catch nose), and the stop face of the catch lock blocking subsequent movement of the catch element counter to the snap-in direction (which would lead to release of the catch connection). Here, the movement of the catch nose during engagement behind the catch section takes place, for example, essentially perpendicularly to the first direction, in which the covering piece is moved, until the catch element snaps behind the catch section.

In another embodiment of the invention, the catch connection is secured by virtue of the fact that the stop face of the catch lock interacts with an outer surface of the catch element that faces away from the catch section and, for example, comes to rest on this surface, to ensure that the catch element cannot be raised from the catch section. During this process, the catch lock can engage around the catch element on its surface facing away from the catch section.

The catch lock may be hook-shaped, e.g. L-shaped, the inner contour of the hook defining a stop face that engages around the catch element.

The catch lock is preferably elastic, a catch-lock end section that can be bent away elastically forming, for example, a stop face on which the catch element is supported.

It is a simple matter for the catch lock to be formed integrally on the covering piece, with the result that no additional components are required to secure the catch connection.

To facilitate the introduction of the catch element in the direction of the catch section and behind the catch section, the catch lock can have an insertion bevel, which extends at an acute angle to the direction in which the covering piece can be pushed onto the steering wheel body. As an alternative or in addition, a corresponding insertion bevel can also be provided on the catch element itself.

The catch element too is preferably of elastic design to facilitate the introduction and snapping in of the catch element behind the associated catch section. For example, the catch element can have a catch nose that can be bent out elastically and snaps behind the catch section to establish the catch connection.

In another embodiment of the invention, the catch element engages around the catch section with two face sections extending at an angle, in particular perpendicularly, to one another, and the catch lock acts with its stop face on the catch element in such a way that the two catch-element face sections extending at an angle to one another are acted upon in a direction toward the catch section. However, it is quite permissible here for there to be a certain play between the catch section and the catch element.

According to yet another embodiment of the invention, at least two covering pieces, which surround the steering wheel body along the section to be covered and are connected to one another by means of a catch connection, are provided to cover a section of a steering wheel, a catch element of the first covering piece engaging behind a catch section of the second covering piece, and the second covering piece has a catch lock with a stop face, on which the catch element can be supported and which thereby counteracts release of the catch connection.

The two covering pieces may be brought into connection with one another in a first direction, the catch element snapping behind the catch section, and if the stop face of the catch lock blocks a movement of the catch element counter to the snap-in direction.

The covering pieces themselves are preferably designed as open ring segments, the mutually facing ends of the two covering pieces in each case being interlocked by means of a catch element and an associated catch section.

According to still another embodiment of the invention, the at least one covering piece provided to cover a section of the steering wheel is connected directly to the steering wheel body by the catch connection (i.e. the catch element or the catch section is provided on the covering piece and the respective other element of the catch connection is associated with the steering wheel body), the covering piece or the steering wheel body having a catch lock with a stop face, on which the catch element can be supported and which thereby counteracts release of the catch connection. This variant of the invention is advantageous particularly when only a single covering piece is to be secured on the steering wheel body by means of the catch connection, e.g. because another covering piece is already integrated into the steering wheel body, with the result that the latter needs further covering over only part of its circumference.

The steering-wheel cover according to the invention can be used, in particular, to cover the spokes of a steering wheel. This allows the covering pieces to be produced in a very simple manner by injection molding, it being possible to mold both the elements of the catch connection itself and the catchlock integrally on the respective covering pieces while nevertheless readily removing the mold required for this purpose.

Other examples of suitable materials for use as a material for the covering pieces, in addition to plastic, are light metals such as aluminum or magnesium. The covering pieces are then preferably produced by die-casting, lost-wax casting or thixotropic die-casting.

A steering wheel with a steering-wheel cover of the type described above, the steering-wheel cover being used, in particular, to cover the spokes of the steering wheel.

Here, means for holding the steering-wheel cover on the steering wheel body in a manner fixed against rotation can additionally be provided, e.g. in the form of a projection and an associated recess, which engage in one another. The projection can simply be formed by the catch lock of the second covering piece, which engages in a corresponding recess in the steering wheel body.

At the same time, the catch lock is also stabilized if it is supported on the steering wheel body, e.g. on said recess in the steering wheel body.

Means for centering the steering-wheel cover on the steering wheel body may be provided. These can, for example, be formed by elastic supporting elements, which are arranged between the steering wheel body and the steering-wheel cover and via which the steering-wheel cover is supported on the steering wheel body. Here, use is made of the fact that the covering pieces are curved on their inside, which faces the steering wheel body, thereby enabling centering to be accomplished in this way.

The supporting elements may be preferably arranged opposite one another on both sides of the steering wheel body and can be formed integrally on the steering wheel body, e.g. as lips integrally formed on a casing foamed around the steering wheel skeleton.

Further features and advantages of the invention will become apparent from the following description of an exemplary embodiment with reference to the figures, in which:

It is to be understood that both the foregoing general description and the following detailed description are exemplary and explanatory only and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Figure 1:
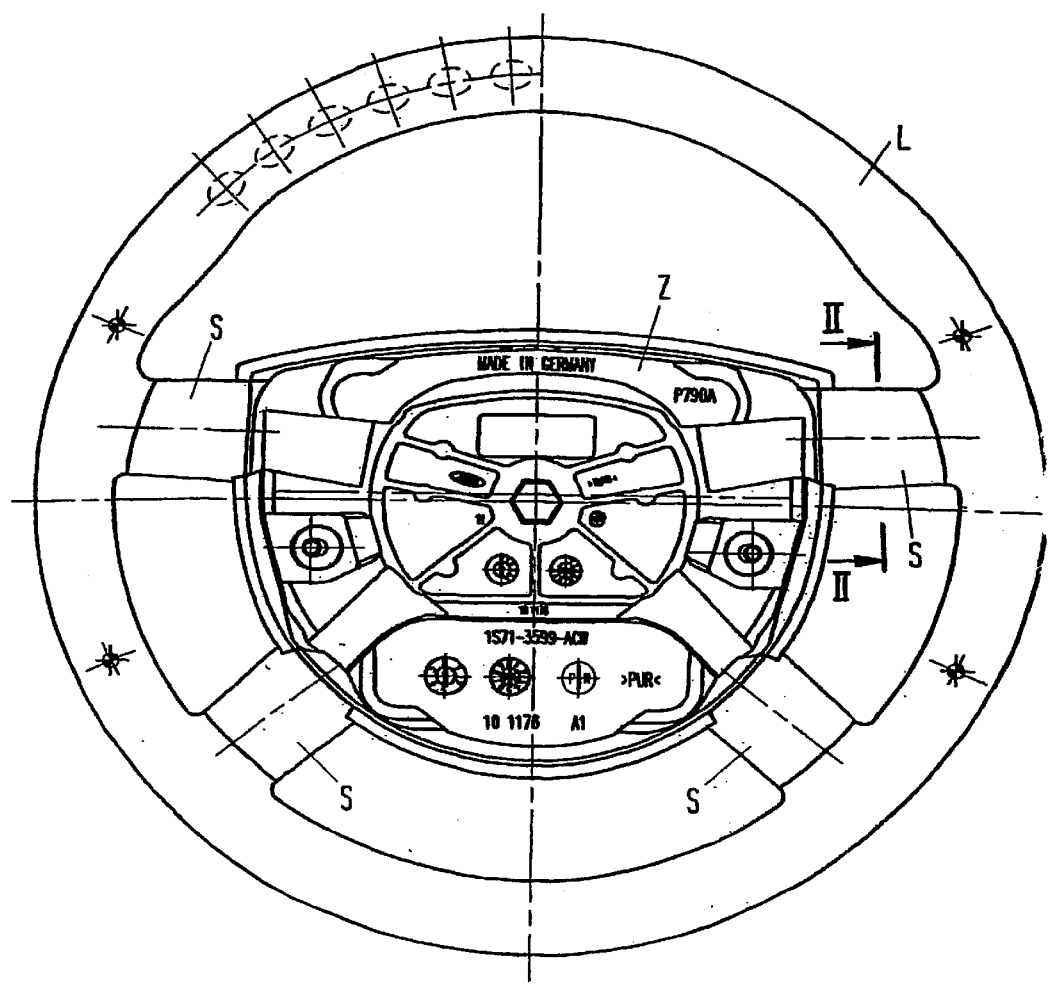
FIG. 1 shows a plan view of a steering wheel.

FIG. 1 shows a plan view of a steering wheel, the essential components of which are a central steering-wheel area Z, spokes S and a steering wheel rim L.

The central area Z of the steering wheel serves to accommodate a multiplicity of functional components, such as electrical horn contacts and an airbag unit, which do not form the subject matter of the present invention. On the contrary, the crucial element for the invention is the configuration of the steering wheel in the area of the spokes S, which is illustrated in greater detail in FIGS. 2 and 3.

Figure 2:
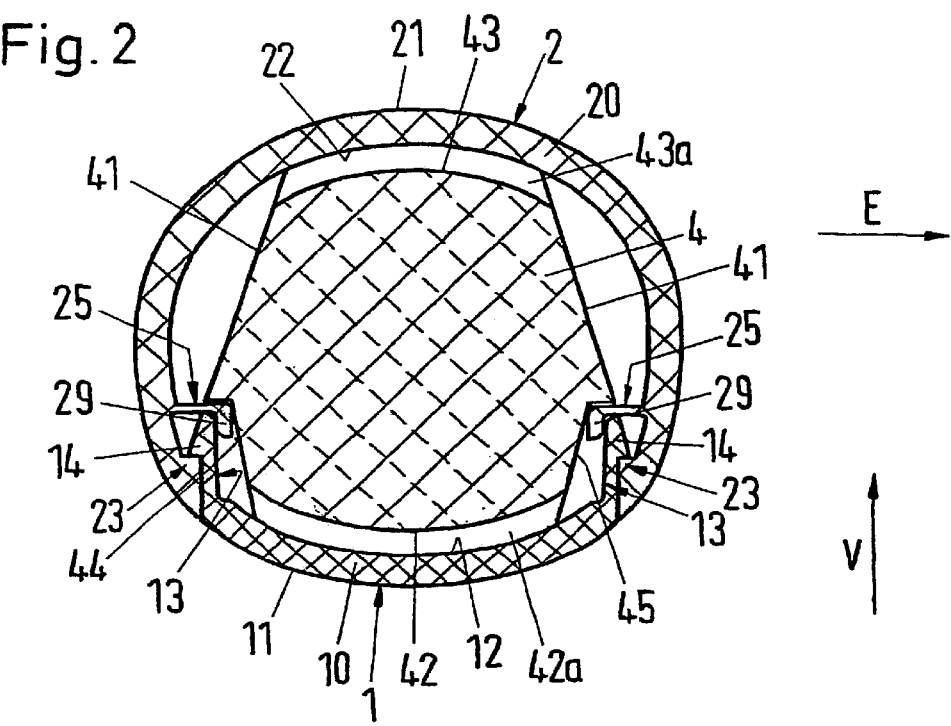
FIG. 2 shows a section through a spoke of the steering wheel in FIG. 1.

According to FIG. 2, the steering wheel body 4 is surrounded in the area of the spokes by a steering-wheel cover in the form of two covering pieces 1, 2 (decorative shells), which determine the look of the steering wheel in the region of the spokes. The steering wheel body 4, the structure of which is not illustrated in greater detail in FIG. 2, generally comprises an inner, load-bearing insert, referred to as a skeleton, and a foam casing composed of polyurethane foam, for example.

The outer contour of the steering wheel body 4, which is determined by its casing, is matched to the respective associated inner contours 12 and 22 of the two covering pieces in two mutually opposite sections 42, 43. In this arrangement, the steering wheel body 4 is supported on the associated inner contours 12 and 22 respectively of the two covering pieces 1, 2 via elastic elements 42a, 43a in the form of lips formed integrally on the steering wheel body 4. The curvature and contour of the lips 42a, 43a are matched to the associated contours 12, 42 and 22, 43 of the steering wheel body 4 and the covering pieces 1, 2 respectively. Centering of the covering pieces 1, 2 relative to the steering wheel body 4 is thereby achieved by means of the lips 42a, 43a.

Extending between the two mutually opposite sections 42, 43 mentioned, which serve for centering, the outer contour of the steering wheel body extends essentially in a straight line, two mutually opposite recesses 44, 45 being provided in this area 41 of the outer contour of the steering wheel body 4 and accommodating the elements provided for the interlocking of the two covering pieces 1, 2. In this arrangement, a respective element serving as a catch lock 25 is supported on the wall of the respectively associated recess 44 and 45. The cover comprising the two covering pieces 1, 2 is thereby held securely against twisting on the steering wheel body 4.

The two covering pieces 1, 2 themselves are each of essentially C-shaped design and are connected to one another by means of two catch connections 13, 23. The two catch connections each comprise an elastic catch element 13 of the first covering piece 1, said catch element 13 being provided with a catch nose 14, and a catch section 23 of the second covering piece 2, behind which the catch nose 14 of the respective catch element 13 engages. The catch connections 13, 23 are each secured by a respective catch lock 25, which is formed integrally on the second covering piece and, with an end section 29, engages around a respective catch element 13 in the region of its catch nose 14. Further details of the catch connections 13, 23 and the associated catch lock 25 are explained below with reference to FIG. 3.

In the interlocked condition, the two covering pieces 1, 2 (decorative shells), which can be injection-molded from plastic for example, completely surround the steering wheel body 4 in the area of the spokes and thus form a spoke cover. The outer contour 11, 21 of the covering pieces 1, 2 determines the look of the spokes. The inner contour 12, 22 of the covering pieces, on the other hand, is of significance primarily with regard to connection to the steering wheel body 4 (centering and anti-twisting safeguard) as explained above. Those elements that serve for the interlocking of the covering pieces 1, 2 are formed integrally toward the inside on the C-shaped main bodies 10, 20 of the covering pieces 1, 2.

Figure 3:
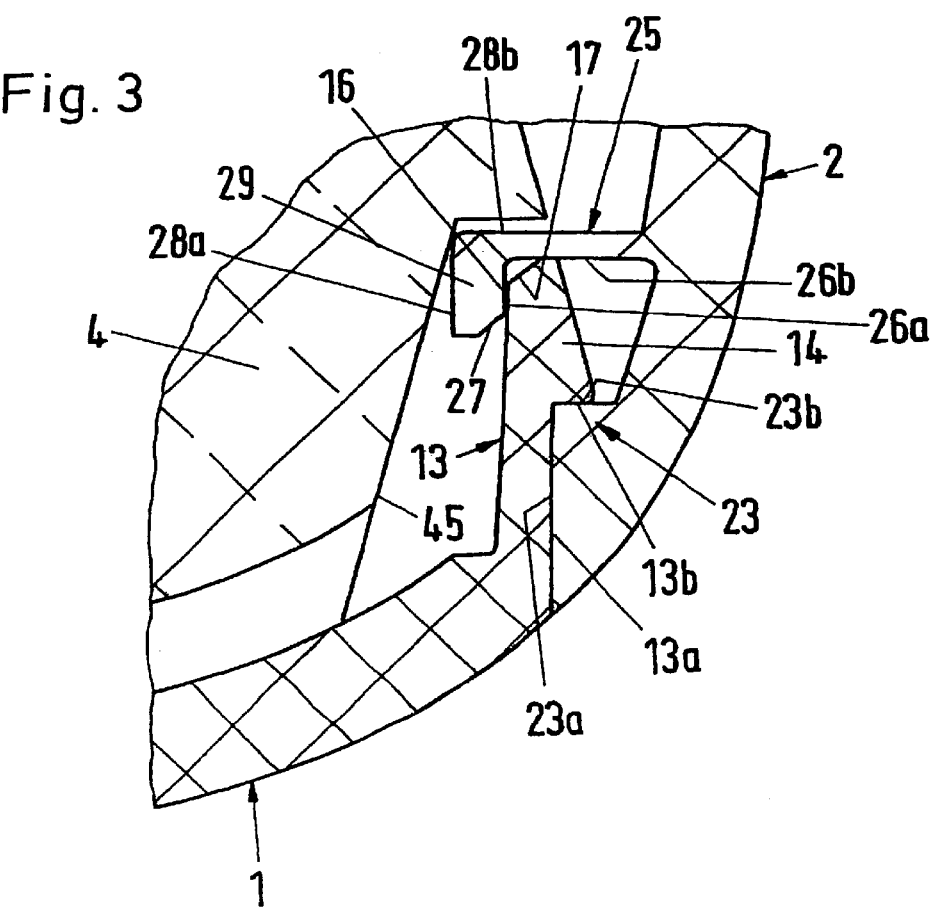
FIG. 3 shows a detail of FIG. 2 with an enlarged representation of the section, in which two covering pieces for the spoke are interlocked.

As can be seen, in particular, from the enlarged detail illustration in FIG. 3, a respective catch section 23 is formed integrally on each of the end sections of the second covering piece 2, forming two catch faces 23a, 23b extending essentially perpendicularly to one another. The catch nose 14 of a catch element 13 engages around the catch section 23, the catch element 13 resting by means of two inner face sections 13a, 13b extending essentially perpendicularly to one another against two face sections 23a, 23b (catch face) of the catch section 23.

On its outer surface, that facing away from the catch section 23, the catch element 13 is engaged around in the area of its catch nose 14 by a catch lock, which comprises a web, which projects inward perpendicularly from the second covering piece, and an end section 29, which is angled perpendicularly away from this web. In this arrangement, the catch lock rests by its inner face sections 26a, 26b, which are formed by the web and the angled end section 29, against the outer surface of the catch element 13 (if appropriate with a certain play). The inner face sections 26a, 26b thus form a stop face for the catch element 13.

The outer surface of the catch lock 25, which comprises two surface section 28a, 28b, extending essentially perpendicularly to one another, engages in the recess 45 of the steering wheel body 4 in such a way that the mobility (deformability) of the catch lock 25 is limited by the walls of the recess 45.

To assemble the steering-wheel cover, the two covering pieces 1, 2 are moved toward one another in a first direction V, enclosing between them the steering wheel body 4 in the region of a steering wheel spoke. As soon as the ends of the covering pieces 1, 2 come into contact with one another during this relative motion of the two covering pieces 1, 2, the catch elements 13, which are of elastic design, are bent over inward somewhat. During a further movement in direction of displacement V, the catch elements 13 finally come into contact, by means of their insertion bevels 17—provided in the region of the catch noses 14—with associated insertion bevels 27 on the catch lock 25. The insertion bevels 17, 27 slide over one another in such a way that, on the one hand, the end sections of the catch locks 25 are bent away inward slightly and, at the same time, the catch noses 14 of the catch elements 13 can snap behind the catch sections 23 of the second covering piece 2 in a snap-in direction E transverse to the direction of displacement V. A catch connection is thereby formed between the first covering piece 1 and the second covering piece 2.

The catch connections 13, 23 are secured by the catch locks 25, which each engage around a catch element 13 in the region of its catch nose 14 and rest against it in such a way that they counteract lifting off of the catch element 13 from the outer surface 23a, 23b of the associated catch section 23.

The deformability of the catch lock 25 itself is limited by the inner surface of the recesses 44, 45 of the steering wheel body 4, said surface facing the respective catch lock 25. This prevents the catch elements 13 from being released due to the end sections 29 of the catch locks 25 being bent out.

As a result, the catch connections 13, 23 between the first and the second covering piece, which are secured by the catch locks 25, can only be released by destruction unless a tool is used. No additional connecting means, such as screws, rivets or adhesive, were required to create a connection of this kind, the inner surfaces 26a, 26b of the catch locks, which serve as stop faces and on which the catch elements 13 are supported by their outer surfaces, being sufficient.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A steering-wheel cover for covering a section of a steering wheel body, comprising:

a covering piece surrounding the section of the steering wheel body to be covered, the covering piece being fixed relative to the steering wheel body by a catch connection;

the catch connection comprising a catch element engaging behind an associated catch section and a catch lock with a stop face positioned to engage the catch element and counteract the release of the catch connection, and wherein the catch lock is formed integrally on the covering piece.

2. The steering-wheel cover as claimed in claim 1, wherein the covering piece is configured to be pushed onto the steering wheel body in a first direction, the catch element snapping behind the catch section, and wherein the stop face of the catch lock blocks movement of the catch element in a direction opposite to the first direction.

3. The steering-wheel cover as claimed in claim 4, wherein the catch element is elastic.

4. The steering-wheel cover as claimed claim 1, wherein the catch lock engages around the catch element.

5. The steering-wheel cover as claimed in claim 4, wherein the catch lock is hook-shaped.

6. The steering-wheel cover as claimed in claim 4, wherein the catch lock is elastic.

7. The steering-wheel cover as claimed in claim 6, wherein the catch lock includes an end section that can be bent out elastically and forms at least part of the stop face, wherein the end section can be bent out to allow the catch element to engage the catch section.

8. The steering-wheel cover as claimed claim 6, wherein the catch lock includes a beveled surface that facilitates the engagement movement of the catch element to an engaged position with the catch section.

9. The steering-wheel cover as claimed in claim 8, wherein the catch element includes a beveled surface that facilitates the movement of the catch element relative to the catch lock to thereby permit engagement of the catch element with the catch section.

10. The steering-wheel cover as claimed in claim 9, wherein each of the beveled surfaces are positioned to slide on each other when the catch element moves to engage the catch section.

11. The steering-wheel cover as claimed in claim 4, wherein the catch element has a catch nose that engages behind the catch section.

12. The steering-wheel cover as claimed in claim 4, wherein the catch element includes two faces that engage the catch section, the two faces being substantially perpendicular to each other.

13. The steering-wheel cover as claimed in claim 12, wherein the stop face of the catch lock is configured to engage the catch element in such a way that the two faces are forced toward the catch section.

14. The steering-wheel cover as claimed in claim 1, wherein the stop face interacts with a surface of the catch element that faces away from the catch section.

15. A steering-wheel cover for covering a section of a steering wheel body, comprising:
   two covering pieces surrounding the section of the steering wheel body to be covered;
   wherein the covering pieces are connected together by a catch connection that includes a catch element located on the first covering piece and a catch section located on the second covering piece, the catch element engaging behind the catch section; and
   wherein the catch connection further includes a catch lock located on the second covering piece, the catch lock including a stop face positioned to engage the catch element and counteract the release of the catch connection.

16. The steering-wheel cover as claimed in claim 15, wherein the two covering pieces are configured to be pushed onto the steering wheel body in a first direction, the catch element snapping behind the catch section, and wherein the stop face of the catch lock blocks movement of the catch element in a direction opposite to the first direction.

17. The steering-wheel cover as claimed in claim 15, wherein the two covering pieces are interlocked together.

18. The steering-wheel cover as claimed in claim 15, wherein the covering pieces are provided to cover the spokes of a steering wheel.

19. The steering wheel as claimed in claim 18, further comprising means for holding the steering-wheel cover on the steering wheel body in a manner fixed against rotation.

20. The steering wheel as claimed in claim 19, wherein the steering-wheel cover is mounted on the steering wheel body in a manner fixed against rotation by the engagement of a projection in a recess.

21. The steering wheel as claimed in claim 19, wherein the catch lock is supported on the steering wheel body by a surface that faces away from the catch element.

22. The steering wheel as claimed in claim 21, wherein the catch lock engages in a recess of the steering wheel body.

23. The steering wheel as claimed in claim 20, further comprising means for centering the steering-wheel cover on the steering wheel body.

24. The steering wheel as claimed in claim 23, wherein the means for centering includes supporting elements, which are arranged between the steering wheel body and the steering-wheel cover and through which the steering-wheel cover is supported on the steering wheel body.

25. The steering wheel as claimed in claim 24, wherein the supporting elements are positioned on opposite sides of the steering wheel body.

26. The steering wheel as claimed in claim 25, wherein the supporting elements are formed on the steering wheel body and are formed by lips formed on a casing formed around the steering wheel skeleton.

* * * * *